United States Patent
Niu et al.

(10) Patent No.: US 11,974,235 B2
(45) Date of Patent: Apr. 30, 2024

(54) METHODS OF TYPE 1 UL GAP ACTIVATION AND DEACTIVATION IN FR2

(71) Applicant: APPLE INC., Cupertino, CA (US)

(72) Inventors: Huaning Niu, Cupertino, CA (US); Dawei Zhang, Cupertino, CA (US); Jie Cui, Cupertino, CA (US); Laxminarayana Pillutla, San Diego, CA (US); Manasa Raghavan, Cupertino, CA (US); Qiming Li, Beijing (CN); Sharad Sambhwani, San Diego, CA (US); Xiang Chen, Cupertino, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,400

(22) PCT Filed: Jul. 27, 2021

(86) PCT No.: PCT/CN2021/108747
§ 371 (c)(1),
(2) Date: Sep. 17, 2021

(87) PCT Pub. No.: WO2023/004599
PCT Pub. Date: Feb. 2, 2023

(65) Prior Publication Data
US 2024/0107464 A1   Mar. 28, 2024

(51) Int. Cl.
*H04W 52/36* (2009.01)

(52) U.S. Cl.
CPC ....... *H04W 52/365* (2013.01); *H04W 52/367* (2013.01)

(58) Field of Classification Search
CPC .......................... H04W 52/365; H04W 52/367
See application file for complete search history.

(56) References Cited

U.S. PATENT DOCUMENTS

| 2017/0339712 | A1* | 11/2017 | Rico Alvarino ...... H04W 72/23 |
| 2022/0109549 | A1* | 4/2022 | Abotabl ................ H04L 1/1896 |
| 2022/0337278 | A1* | 10/2022 | Caporal Del Barrio ..................... H04W 36/0072 |

FOREIGN PATENT DOCUMENTS

| CN | 109348740 A | 2/2019 |
| WO | 2021109447 A1 | 6/2021 |

OTHER PUBLICATIONS

Apple Inc., "WF on FR2 enhancement part 2: UL gap", R4-2107857, 3GPP TSF-RAN WG4 #99-e Meeting, May 19-27, 2021, 7 pages.
(Continued)

*Primary Examiner* — Michael A Keller
(74) *Attorney, Agent, or Firm* — Dorsey & Whitney LLP

(57) ABSTRACT

Activating an uplink (UL) gap at a base station may include decoding a user equipment (UE) UL gap capability report received from a UE. A radio resource control (RRC) UL gap configuration may be encoded for transmission to the UE. A power headroom report (PHR) medium access control (MAC) control element (CE) received from the UE may be decoded. The PHR MAC CE may include at least one of a P value or a power management maximum power reduction (P-MPR) value. Decoding the measurement information may include determining that the P value is equal to one or the P-MPR value is greater than zero. Based on determining that the P value is equal to one or the P-MPR value is greater than zero, the UL gap configuration may be implicitly activated.

20 Claims, 6 Drawing Sheets

(56) References Cited

OTHER PUBLICATIONS

Moderator (Apple), "Email discussion summary for [99-e][138] NR_RF_FR2_req_enh2_Part_3", R4-2107664, 3GPP TSG-RAN WG4 Meeting # 99-e, Electronic Meeting, May 19-27, 2021, 40 pages.
PCT/CN2021/108747, International Search Report and Written Opinion, dated Apr. 13, 2022, 9 pages.

* cited by examiner

METHODS OF TYPE 1 UL GAP ACTIVATION AND DEACTIVATION IN FR2

TECHNICAL FIELD

This application relates generally to wireless communication systems, including implicit UL gap activation and deactivation.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi©).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

By way of background, uplink (UL) gaps for self-calibration and monitoring purposes may be particularly desirable. In particular, such self-calibration and monitoring purposes may include: 1. Power amplifier (PA) efficiency and power consumption; 2. Transceiver calibration due to temperature variation; and 3. UE Tx power management. Notably, such self-calibration and monitoring associated with UL gaps may not preclude other self-calibration and monitoring. Accordingly, the principles described herein include various metrics to be used in determining whether to activate or deactivate a UL gap.

The following assumptions for UL gap related configurations may apply: 1. A UL gap is configured by a network (NW) via RRC signaling. Once a UL gap is configured, it can be activated or deactivated, which decision may be left up to the NW.

In some embodiments, a UE may provide gap preferences/capabilities. In an example, gap configuration candidates may include: 1. A gap periodicity of: 5 milliseconds (ms), 10 ms, 20 ms, 40 ms, 80 ms, 160 ms, 320 ms, and so forth; and 2. A gap duration of: 62.5 microseconds (us), 125 us, 250 us, 500 us, 1000 us, and so forth. Notably, while particular examples of gap periodicity and gap duration are provided above, any appropriate gap periodicity and/or gap duration may be utilized when practicing the principles described herein.

Figure 1:
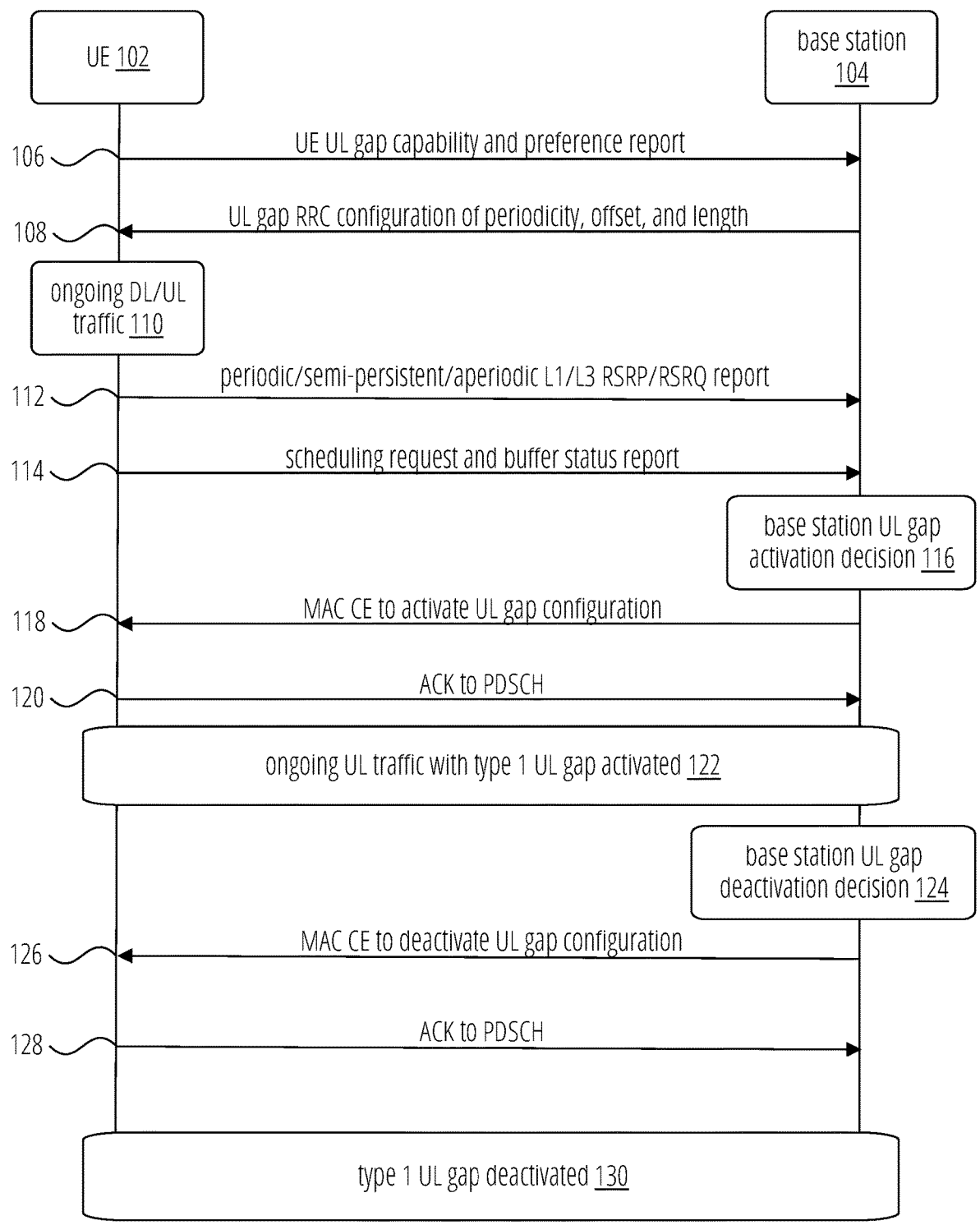
FIG. 1 illustrates a data flowchart for explicit UL gap activation in accordance with one embodiment.

FIG. 1 illustrates an overall message flow for configuring and activating/deactivating a UL gap (e.g., a type 1 UL gap). Activating a UL gap may also include a network trigger, as further described with respect to FIG. 1. As shown, FIG. 1 includes a UE 102 and a base station 104 (e.g., a gNB).

Configuring a UL gap may be performed via radio resource control (RRC) configuration based on a given UE's capabilities and/or gap preferences. Accordingly, the UE 102 may indicate a desire for a UL gap for body proximity sensing (BPS) in frequency range 2 (FR2) to the base station 104, in addition to the UE providing a report associated with the UE's preferred UL gap configuration, as represented by arrow 106. Notably, the UE's gap capabilities and/or preferences may include information associated with implicitly activating (and/or implicitly deactivating) a configured UL gap, as further described herein. Upon receiving such information from the UE, the base station 104 may then configure a UL gap periodicity, offset, and length through an RRC configuration, as represented by arrow 108. In the meantime, ongoing UL/downlink (DL) traffic may be sent between the UE 102 and the base station 104, as represented by block 110. The UE 102 may eventually send one or more measurement reports (layer 1 (L1)/layer 3 (L3)) on a periodic, semi-persistent, or aperiodic basis, as well as a scheduling request and a buffer status report, as represented by arrow 112 and arrow 114, respectively.

As represented by block 116, the base station 104 may make a UL gap activation decision (i.e., based on various factors/triggers, as further discussed herein). Notably, the base station may trigger activation of a UL gap through a medium access control (MAC) control element (CE). In some embodiments, the base station 104 may determine that a UL gap is to be activated for BPS measurement based on: 1. A cell edge condition (e.g., L1-RSRP, L3-RSRP, L1-RSRQ, or L3-RSRQ); 2. A UE traffic condition (e.g., a UE buffer status report); and/or 3. A UE being capable of tdd-MPE-P-MPR-Reporting-r16, as supported in 3GPP Release 16 (Rel-16) (e.g., the UE observes power management maximum power reduction (P-MPR) is needed to meet MPE).

Accordingly, as represented by arrow 118, the base station 104 may send a PDSCH carrying the MAC CE comment to activate the UL gap. The UE may then decode the PDSCH carrying the MAC CE and send an acknowledgement (ACK) back to the base station, as represented by arrow 120. The UL gap may then be activated until a deactivation MAC CE is sent to the UE. In addition, while the UL gap is activated, ongoing UL traffic may continue, as represented by block 122.

As represented by block 124, the base station 104 may make a UL gap deactivation decision. Notably, the base station may also trigger deactivation of a UL gap through a MAC CE. Accordingly, as represented by arrow 126, the base station 104 may send a PDSCH carrying the MAC CE to deactivate the UL gap. The UE may then decode the PDSCH carrying the MAC CE and send an ACK back to base station, as represented by arrow 128. The UL gap may then be deactivated until another activation MAC CE is sent to the UE, as represented by block 130.

While FIG. 1 illustrates UL gap activation that may include explicit triggering of a UL gap, the principles described herein include solutions for implicit activation of UL gaps to minimize signaling (e.g., depending on a power headroom (PHR) report). For instance, if a configured UL gap is not currently activated, one of the following two options may be utilized: 1. When a "P" field indicates power management maximum power reduction (P-MPR) is applied (i.e., P=1), implicit activation may occur. Regarding the "P" field, if mpe-Reporting-FR2 is configured and the Serving Cell operates on FR2, a medium access control (MAC) entity may set this field to 0 if the applied P-MPR value is less than P-MPR_00 as specified in 3GPP TS 38.133 [11], to meet maximum permissible exposure (MPE) requirements as specified in 3GPP TS 38.101-2 [15], and to 1 otherwise; and 2. If mpe-Reporting-FR2 is configured and P-MPR report is greater than 0, a UL gap may be implicitly activated.

In contrast, if a UL gap is implicitly activated, the following may apply: 1. If a UL gap is already activated and if P=1 or an P-MPR report>0 is sent by the UE (i.e., BPS is on and target is nearby), no action is taken. Similarly, if a UL gap is already activated and P is set to 0 or P-MPR report is 0 (i.e., BPS is ON and no target is nearby), no action is taken.

Figure 2:
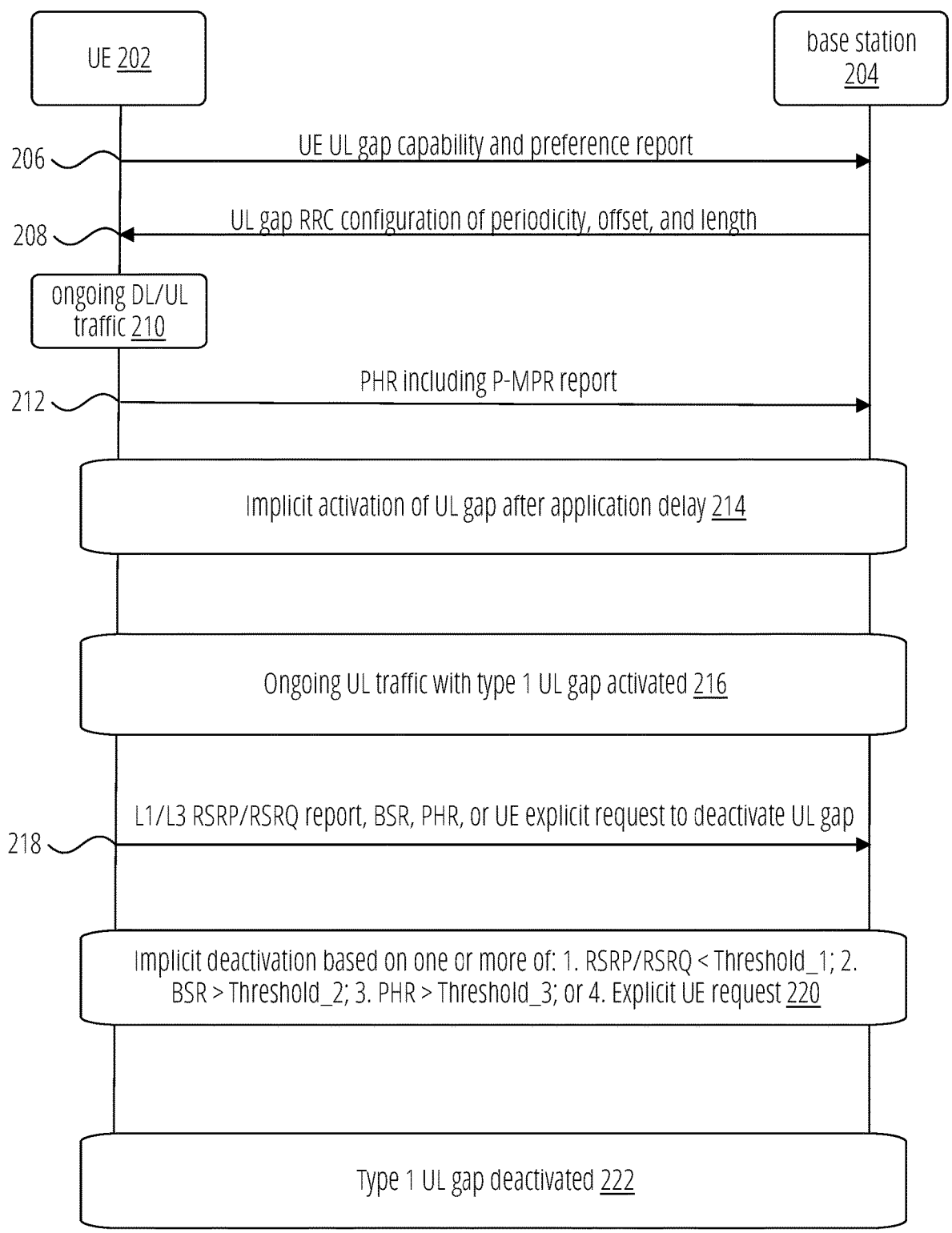
FIG. 2 illustrates a data flowchart for implicit UL gap activation in accordance with one embodiment.

FIG. 2 illustrates an overall message flow for configuring and implicitly activating/deactivating a UL gap (e.g., a type 1 UL gap). As shown, FIG. 2 includes a UE 202 and a base station 204 (e.g., a gNB). Configuring a UL gap may be performed via radio resource control (RRC) configuration based on a given UE's capabilities and/or gap preferences. Accordingly, the UE 202 may indicate a desire for a UL gap for body proximity sensing (BPS) to the base station 204, in addition to the UE providing a report associated with the UE's capabilities (and potentially, preferences) associated with a UL gap configuration, as represented by arrow 206.

Upon receiving such information from the UE, the base station 204 may then configure a UL gap periodicity, offset, and length through an RRC configuration, as represented by arrow 208. In the meantime, ongoing UL/downlink (DL) traffic may be sent between the UE 202 and the base station 204, as represented by block 210. The UE 202 may eventually send a PHR MAC CE including one or more measurement values (e.g., a P value, a P-MPR value, and so forth), as represented by arrow 212.

As represented by block 214, the base station 204 may implicitly activate the configured UL gap based on information provided within the PHR MAC CE, as further described herein. For instance, the base station may implicitly activate (i.e., without explicitly notifying the UE of such UL gap activation) the configured UL gap based on determining that a P value received within the PHR is equal to one. While the UL gap is activated, ongoing UL traffic may continue, as represented by block 216.

Eventually, the UE may provide additional measurement information (e.g., a L1/L3 RSRP/RSRQ report, a buffer status report (BSR), a PHR) or an explicit request to deactivate the configured UL gap, as represented by arrow 218. As represented by block 220, the base station 204 may then perform a UL gap deactivation decision based on the measurement information received (e.g., RSRP/RSRQ, BSR, and so forth). As further described herein, the base station may compare one or more measured values (e.g., BSR, RSRP, and so forth) against a threshold corresponding to the particular type of measured value (e.g., BSR, RSRP, and so forth) to determine whether an implicit deactivation of the UL gap is to be performed. Alternatively, the base station may implicitly deactivate the UL gap based on a received UL gap deactivation request received from the UE. The UL gap may then be deactivated until another activation (implicit or explicit) is performed by the base station based on received measurement information, as represented by block 222.

The timeline for implicit activation when a UE reports using PHR MAC control element (CE) may include various additional options. In a first option, the UL gap may be activated immediately after a PHR MAC CE transmission. (i.e., the last orthogonal frequency division multiplexing (OFDM) symbol of a physical uplink shared channel (PUSCH) transmission including the PHR MAC CE). Such option may include a potential mismatch between a UE and a gNB without acknowledgement.

In a second option, the UL gap may be activated after a MAC CE processing time of 3 ms. For instance, assuming that slot n is a PHR MAC CE report, the UL gap would be activated in slot n+3 ms/(slot duration). In some embodiments, the UL gap may be activated after a MAC CE processing time of between approximately 1 ms and 5 ms. In other embodiments, the UL gap may be activated after a MAC CE processing time of approximately 0.5 ms to 10 ms.

Finally, in a third option, the UL gap is activated after confirmation of a PHR MAC CE transmission. NR does not have a physical channel hybrid automatic repeat request indicator channel (PHICH), thus no explicit acknowledgement (ACK)/negative ACK (NACK) occurs. Accordingly, if discontinuous reception (DRX) is configured, the UE does not receive a retransmission grant, and a drx-RetransmissionTimerUL expires, the UL gap may be implicitly activated. In contrast, if DRX is not configured and the UE receives an initial transmission grant with the same hybrid automatic repeat request (HARQ) ID, the UL gap may be implicitly activated.

Similar to implicit activation, implicit deactivation may also be performed. In a first option, deactivation may be limited to explicit deactivation after implicit activation of a UL gap. In a second option, implicit deactivation may be allowed even after implicit activation, with the following possibilities: 1. Implicit deactivation may be based on a buffer status report (BSR). For instance, if a BSR is smaller than a pre-configured threshold, the UL gap may be deactivated implicitly; 2. Implicit deactivation may be based on a PHR field. For instance, if the PHR is greater than a pre-configured threshold and P-MPR>0 or the P field is set to 1 (i.e., even after MPR and P-MPR, additional PHR is still available, as may be the case within a cell center), the UL gap may be deactivated implicitly; or 3. Implicit deactivation may be based on serving cell quality. For instance, if a UE report of Layer 1-reference signal received power (L1-RSRP) or Layer 3-RSRP (L3-RSRP) is greater than a threshold (e.g., as may occur within a cell center), the UL gap may be deactivated implicitly.

In an example related to L3-RSRP, an L3-RSRP threshold can reuse a cell-edge-evaluation defined for Rel-16 radio resource management (RRM) relaxation, as further shown in Table 1 below. More specifically, when L3-RSRP or L3-RSRQ is greater than the configured threshold, the UE may be considered as not being at a cell edge. In such cases, the UL gap may then be deactivated.

TABLE 1

| s-SearchThreshold P-r16 | Specifies the cell selection RX level value (Srxlev) threshold (in dB) for relaxed measurement. NW may configure this value to be less than or equal to s-IntraSearchP parameter and s-NonIntraSearchP parameter. | Field Value in [0-31] Interpreted Value = Field Value * 2 in dB |
| --- | --- | --- |
| s-SearchThreshold Q-r16 | Specifies the cell selection quality value (Squal) threshold (in dB) for relaxed measurement. NW may configure this value to be less than or equal to s-IntraSearchQ parameter and s-NonIntraSearchQ parameter. | Field Value in [0-31] Interpreted Value = Field Value in dB |

In an example related to PHR, a PHR threshold can be configured as 3 dB, or 6 dB (see 3GPP TS 38.321 section 6.1.3.1 for BSR MAC CE details). With respect to BSR, the threshold may be defined for a sum of BSR of all logical channel groups (LCGs). In one alternative, the threshold value can reuse a 5-bit table value (as further shown in 3GPP TS 38.321 Table 6.1.3.1-1). In such cases, the threshold can be configured as 15 (which maps to <=1038 bytes), for instance. Alternatively, the threshold value can be configured using an 8-bit mapping table (as further shown in 3GPP TS 38.321 Table 6.1.3.1-2). In such cases, the threshold can be configured as 128 (which maps to <=31342 bytes), for instance.

A timeline for implicit deactivation may again include various options, as follows: 1. Implicit deactivation may be performed immediately after the last OFDM symbol of a PUSCH transmission. For instance, a PUSCH transmission including a PHR MAC CE, a PUSCH transmission including a BSR MAC CE, or a PUSCH transmission including measurement report RRC signaling; 2. Implicit deactivation may be performed 3 ms after a MAC CE transmission for PHR and BSR MAC CE. If such a report is provided via RRC signaling, an RRC processing delay may also apply; or 3. Implicit deactivation may be performed after an implicit ACK of a PUSCH transmission.

Notably, a UE-specific RRC configuration of a UL gap may indicate: 1. Whether implicit activation is allowed; and/or 2. Whether implicit deactivation is allowed. If implicit deactivation is allowed, a threshold of BSR, PHR, and/or serving cell quality may be configured for each such metric. The base station (e.g., gNB) can configure one criterion (e.g., an L3-RSRP value compared to an L3-RSRP threshold) or a combination of the above metrics (e.g., both BSR<threshold_1, and L3_RSRP>threshold). When multiple criteria are configured, a UL gap can be deactivated if any one of the criteria is met. Alternatively, a base station may be limited to deactivating a UL gap when all of the configured criteria are met.

P-MPR reporting, as more fully discussed above, and P-MPR difference can also be an important test metric for an FR2 UL gap. However, current standards are limited to defining a 3 decibel (dB) step size (see 3GPP TS 38.133) for P-MPR reporting, which has been used for UL gap power management. Table 2 below illustrates the 3 dB step size for P-MPR reporting:

TABLE 2

| Reported value | Measured quantity value | Unit |
| --- | --- | --- |
| P-MPR_00 | 3 ≤ PMP-R < 6 | dB |
| P-MPR_01 | 6 ≤ PMP-R < 9 | dB |
| P-MPR_02 | 9 ≤ PMP-R < 12 | dB |
| P-MPR_03 | PMP-R ≥ 12 | dB |

In a first solution for providing additional granularity, the "P" field and the P-MPR field may be jointly encoded. In particular, when "mpe-reporting-ULgap-R17" is configured, joint coding of the "P" field and P-MPR may be defined. For instance, Table 3 below demonstrates a joint coding example:

TABLE 3

| P | MPE | Measured P-MPR Value |
| --- | --- | --- |
| 0 | 00 | P-MPR_000 |
| 0 | 01 | P-MPR_001 |
| 0 | 10 | P-MPR_010 |
| 0 | 11 | P-MPR_011 |
| 1 | 00 | P-MPR_100 |

TABLE 3-continued

| P | MPE | Measured P-MPR Value |
|---|-----|----------------------|
| 1 | 01  | P-MPR_101            |
| 1 | 10  | P-MPR_110            |
| 1 | 11  | P-MPR_111            |

In one example, the P-MPR can be uniformly quantized with m dB as a step size (i.e., P-MPR_000=<=m dB, P-MPR_001<=2m dB, . . . , P-MPR_110<=7m dB, P_MPR_111>7m dB), where m can be 1.5 dB or 2 dB, as an example. In another example, the P-MPR can be non-uniformly quantized, with a smaller step size in lower ranges and a larger step size in higher ranges.

Figure 3:
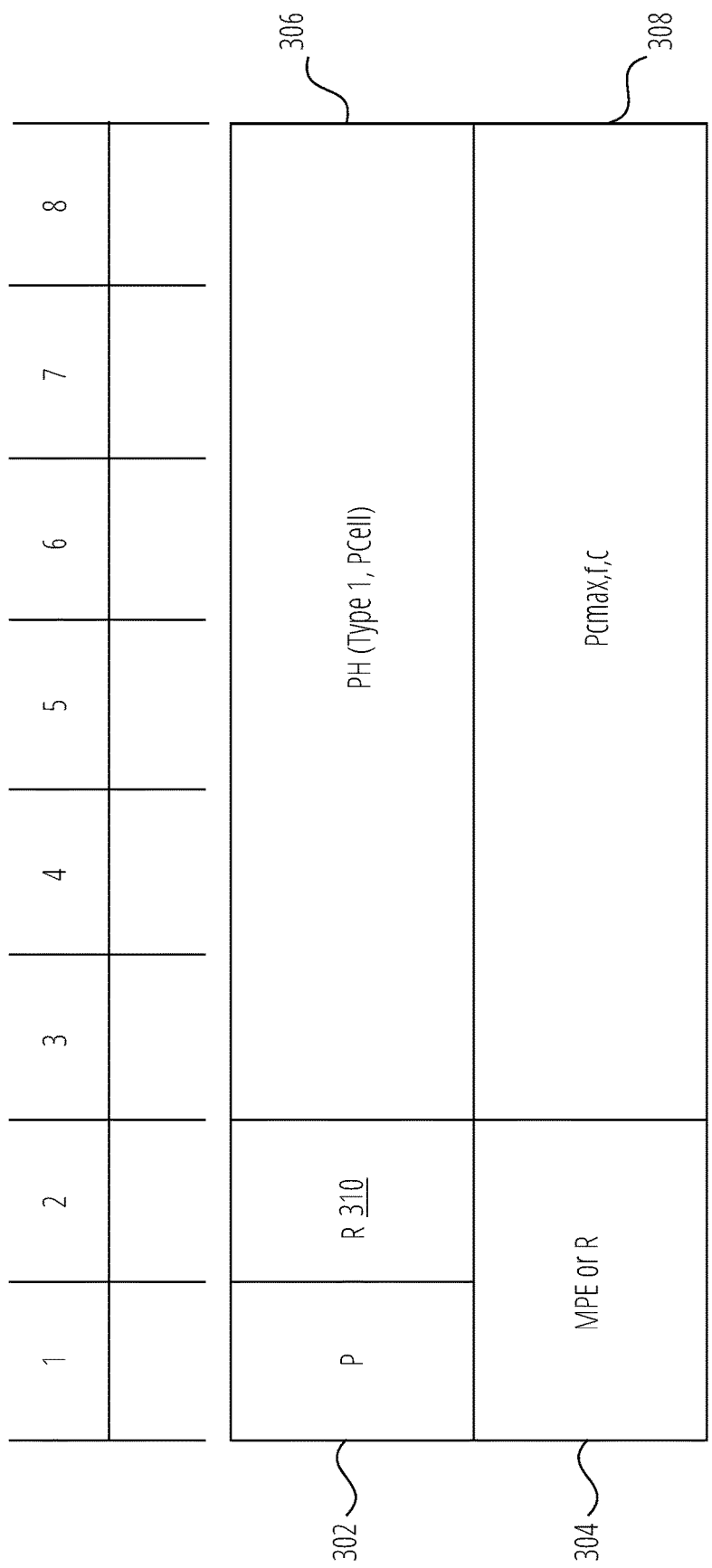
FIG. 3 illustrates power headroom report MAC CE in accordance with one embodiment.

FIG. 3 illustrates a single entry PHR MAC CE associated with the first solution that includes a 1-bit P field 302, one reserved bit 310, a 6-bit power headroom field 306, a 2-bit MPE or R field 304, and a 6-bit $P_{CMAX,f,c}$ field 308. The single PHR MAC CE is further described in 3GPP TS 38.133, which provides:

P: If mpe-Reporting-FR2 is configured and the Serving Cell operates on FR2, the MAC entity shall set this field to 0 if the applied P-MPR value, to meet MPE requirements, as specified in TS 38.101-2[15], is less than P-MPR_00 as specified in TS 38.133[11] and to 1 otherwise. If mpe-Reporting-FR2 is not configured or the Serving Cell operates on FR1, this field indicates whether power backoff is applied due to power management (as allowed by P-MPR, as specified in TS 38.101-1[14], TS38.101-2[15], and TS 38.101-3[16]). The MAC entity shall set the P field to 1 if the corresponding $P_{CMAX,f,c}$ field would have had a different value if no power backoff due to power management had been applied;

MPE: If mpe-Reporting-FR2 is configured, and the Serving Cell operates on FR2, and if the P field is set to 1, this field indicates the applied power backoff to meet MPE requirements, as specified in TS 38.101-2[15]. This field indicates an index to [FIG. 2] and the corresponding measured values of P-MPR levels in dB are specified in TS 38.133[11]. The length of the field is 2 bits. If mpe-Reporting-FR2 is not configured, or if the Serving Cell operates on FR1, or if the P field is set to 0, R bits are present instead.

In a second solution for providing additional granularity, the "P" field may be reinterpreted when "mpe-reporting-ULgap-R17" is configured. In particular, two tables associated with P-MPR may be defined based at least partially on 3GPP TS 38.133. For instance, a first table may be defined for P=0 (i.e., Table 4) and a second table for P=1 (i.e., Table 5), as follows:

TABLE 4

| Reported Value | Measured Quality Value |
|----------------|------------------------|
| P-MPR_00       | P-MRP <= 3 dB          |
| P-MPR_01       | P-MRP <= 6 dB          |
| P-MPR_10       | P-MRP <= 9 dB          |
| P-MPR_11       | P-MRP > 9 dB           |

TABLE 5

| Reported Value | Measured Quality Value |
|----------------|------------------------|
| P-MPR_00       | P-MRP <= 2 dB          |
| P-MPR_01       | P-MRP <= 4 dB          |
| P-MPR_10       | P-MRP <= 6 dB          |
| P-MPR_11       | P-MRP > 6 dB           |

In a third solution for providing additional granularity, a reserved bit in PHR MAC CE may be utilized, as follows: 1. The reserved bit can be jointly coded with the "P" field and MPR field, which may allow for a total of 16 configurable entries; 2. The reserved bit can be jointly coded with the MPR field, which may allow for a total of 8 configurable entries. In this embodiment, the "P" field may be unchanged; or 3. The reserved bit can be jointly coded with the "P" field, which may allow for a total of 4 potential configurations of an MPR table based on 3GPP TS 38.133.

Figure 4:
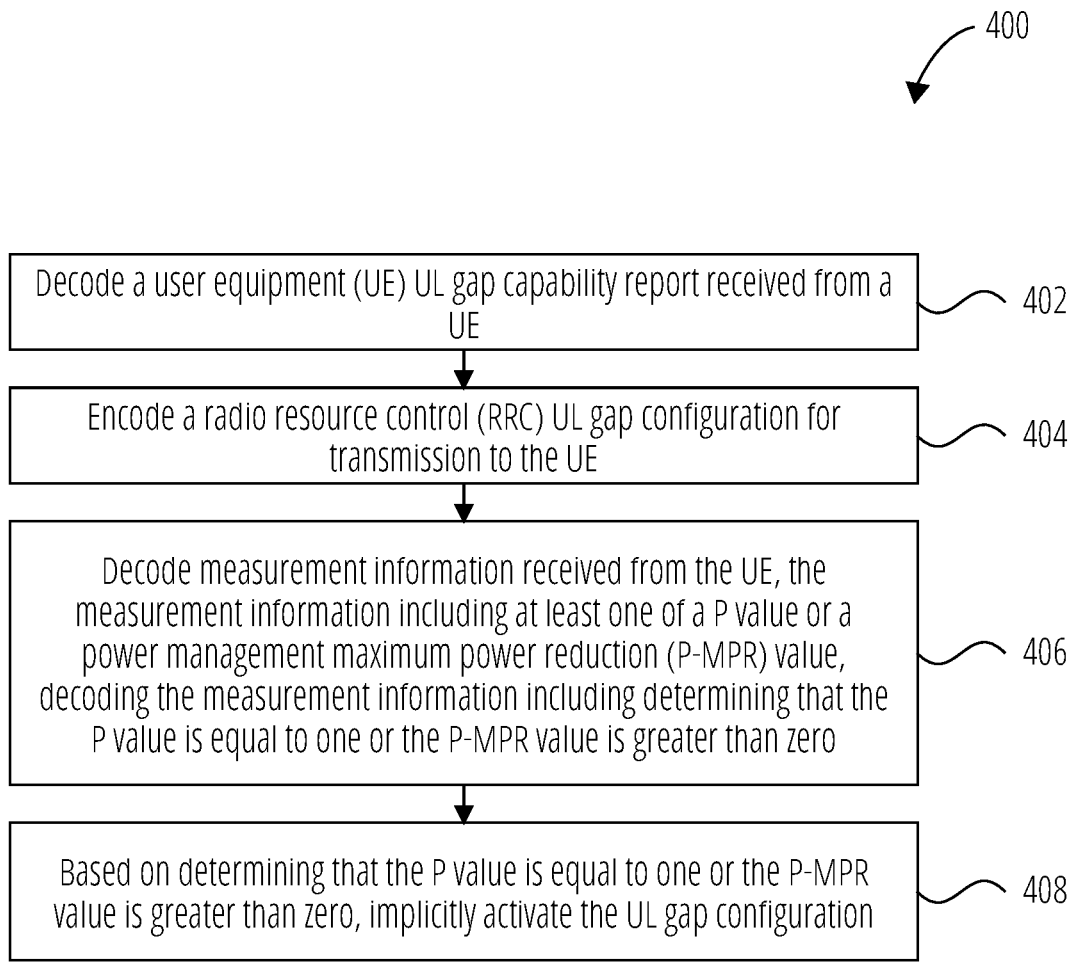
FIG. 4 illustrates a flowchart of a method for activating a UL gap at a base station in accordance with one embodiment.

FIG. 4 illustrates a flowchart of a method 400 for implicitly activating a UL gap at a base station. In block 402, the method 400 decodes a user equipment (UE) UL gap capability report received from a UE. For instance, a UE may provide a base station a preference associated with UL gap periodicity, offset, and/or length. In block 404, the method 400 encodes a radio resource control (RRC) UL gap configuration for transmission to the UE. The RRC UL gap configuration may include configuration information associated with at least one of a periodicity, offset, or length. In an example, the configuration information may be based on the preference(s) provided by the UE.

In block 406, the method 400 decodes measurement information received from the UE. The measurement information may include at least one of a P value or a power management maximum power reduction (P-MPR) value. Decoding the measurement information may include determining that the P value is equal to one or the P-MPR value is greater than zero. For instance, such values may indicate that P-MPR is applied. In block 408, the method 400, based on determining that the P value is equal to one or the P-MPR value is greater than zero, implicitly activating the UL gap configuration. For example, the base station may activate the UL gap configuration without notifying the UE based on the provided P value or P-MPR value.

The method 400 may further include implicitly activating the UL gap configuration comprising activating the UL gap configuration without explicitly informing the UE of activation of the UL gap configuration. The method 400 may further include the UL gap configuration being implicitly activated immediately after transmission of the PHR MAC CE, after processing the PHR MAC CE for approximately three milliseconds (ms), or after implicit acknowledgment of the base station receiving the PHR MAC CE.

The method 400 may further comprise decoding a transmission including additional measurement information received from the UE after the configured UL gap is implicitly activated. The measurement information may include at least one of a buffer status report (BSR), a second P-MPR value, a Layer 1 reference signal received power (L1-RSRP), or a Layer 3 RSRP (L3-RSRP). The UL gap configuration may also be implicitly deactivated based on a value of at least one of the BSR, the second P-MPR, the L1-RSRP, or the L3-RSRP, or an explicit request from the UE to deactivate the UL gap configuration.

The method 400 may further include the UL gap configuration being implicitly deactivated immediately after a last orthogonal frequency-division multiplexing (OFDM) symbol of the transmission including the additional measurement information, approximately three milliseconds (ms) after the transmission including the additional measurement information, or after implicit acknowledgment of the base station receiving the transmission including the additional information. The method may further include implicitly deactivating the UL gap configuration being further based on comparing at least one of the value of the BSR, the second P-MPR, the L1-RSRP, or the L3-RSRP against a corresponding threshold configured for each of the BSR, the second P-MPR, the L1-RSRP, and the L3-RSRP.

The method 400 may further include the UE UL gap capability report including an indication that the UE supports implicit UL gap activation. The method 400 may further include a P field associated with the P value being encoded jointly with a maximum permissible exposure (MPE) value to thereby provide greater granularity associated with the measurement information and the additional measurement information.

The method 400 may further include redefining P-MRP values using a first table for a first set of P-MPR values when the P value is equal to zero and a second table for a second set of P-MPR values when the P value is equal to one to thereby provide greater granularity associated with the measurement information and the additional measurement information. The method 400 may further include a reserved bit within a power headroom (PHR) medium access control (MAC) control element (CE) being used to provide greater granularity associated with the measurement information and the additional measurement information. Using the reserved bit within the PHR MAC CE may comprise at least one of: jointly encoding the reserved bit with a P field associated with the P value and an MPR field associated with the P-MPR value, jointly encoding the reserved bit with the MPR field, or jointly encoding the reserved bit with the P field.

Embodiments contemplated herein include an apparatus comprising means to perform one or more elements of the method 400. This apparatus may be, for example, an apparatus of a base station (such as a network device 618 that is a base station, as described herein).

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, a memory of a base station (such as a memory 622 of a network device 618 that is a base station, as described herein).

Embodiments contemplated herein include an apparatus comprising logic, modules, or circuitry to perform one or more elements of the method 400. This apparatus may be, for example, an apparatus of a base station (such as a network device 618 that is a base station, as described herein).

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a base station (such as a network device 618 that is a base station, as described herein).

Embodiments contemplated herein include a signal as described in or related to one or more elements of the method 400.

Embodiments contemplated herein include a computer program or computer program product comprising instructions, wherein execution of the program by a processing element is to cause the processing element to carry out one or more elements of the method 400. The processor may be a processor of a base station (such as a processor(s) 620 of a network device 618 that is a base station, as described herein). These instructions may be, for example, located in the processor and/or on a memory of the UE (such as a memory 622 of a network device 618 that is a base station, as described herein).

Figure 5:
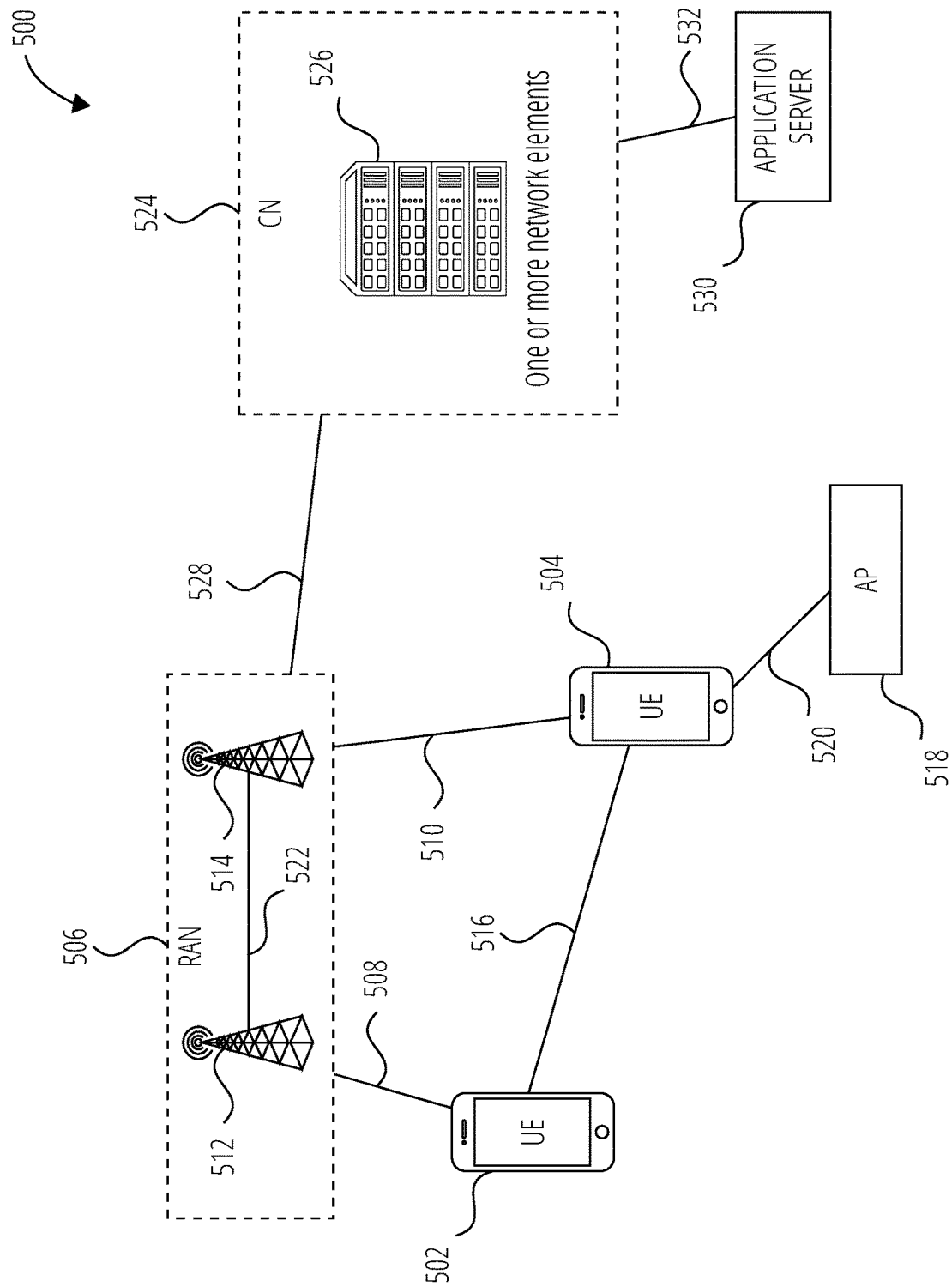
FIG. 5 illustrates an example architecture of a wireless communication system, according to embodiments disclosed herein.

FIG. 5 illustrates an example architecture of a wireless communication system 500, according to embodiments disclosed herein. The following description is provided for an example wireless communication system 500 that operates in conjunction with the LTE system standards and/or 5G or NR system standards as provided by 3GPP technical specifications.

As shown by FIG. 5, the wireless communication system 500 includes UE 502 and UE 504 (although any number of UEs may be used). In this example, the UE 502 and the UE 504 are illustrated as smartphones (e.g., handheld touchscreen mobile computing devices connectable to one or more cellular networks), but may also comprise any mobile or non-mobile computing device configured for wireless communication.

The UE 502 and UE 504 may be configured to communicatively couple with a RAN 506. In embodiments, the RAN 506 may be NG-RAN, E-UTRAN, etc. The UE 502 and UE 504 utilize connections (or channels) (shown as connection 508 and connection 510, respectively) with the RAN 506, each of which comprises a physical communications interface. The RAN 506 can include one or more base stations, such as base station 512 and base station 514, that enable the connection 508 and connection 510.

In this example, the connection 508 and connection 510 are air interfaces to enable such communicative coupling, and may be consistent with RAT(s) used by the RAN 506, such as, for example, an LTE and/or NR.

In some embodiments, the UE 502 and UE 504 may also directly exchange communication data via a sidelink interface 516. The UE 504 is shown to be configured to access an access point (shown as AP 518) via connection 520. By way of example, the connection 520 can comprise a local wireless connection, such as a connection consistent with any IEEE 802.11 protocol, wherein the AP 518 may comprise a Wi-Fi® router. In this example, the AP 518 may be connected to another network (for example, the Internet) without going through a CN 524.

In embodiments, the UE 502 and UE 504 can be configured to communicate using orthogonal frequency division multiplexing (OFDM) communication signals with each other or with the base station 512 and/or the base station 514 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 512 or base station 514 may be implemented as one or more software entities running on server computers as part of a virtual network. In addition, or in other embodiments, the base station 512 or base station 514 may be configured to communicate with one another via interface 522. In embodiments where the wireless communication system 500 is an LTE system (e.g., when the CN 524 is an EPC), the interface 522 may be an X2 interface. The X2 interface may be defined between two or more base stations (e.g., two or more eNBs and the like) that connect to an EPC, and/or between two eNBs connecting to the EPC. In embodiments where the wireless communication system 500 is an NR system (e.g., when CN 524 is a 5GC), the interface 522 may be an Xn interface. The Xn interface is defined between two or more base stations (e.g., two or more gNBs and the like) that connect to 5GC, between a base station 512 (e.g., a gNB) connecting to 5GC and an eNB, and/or between two eNBs connecting to 5GC (e.g., CN 524).

The RAN 506 is shown to be communicatively coupled to the CN 524. The CN 524 may comprise one or more network elements 526, which are configured to offer various data and telecommunications services to customers/subscribers (e.g., users of UE 502 and UE 504) who are connected to the CN 524 via the RAN 506. The components of the CN 524 may be implemented in one physical device or separate physical devices including components to read and execute instructions from a machine-readable or computer-readable medium (e.g., a non-transitory machine-readable storage medium).

In embodiments, the CN 524 may be an EPC, and the RAN 506 may be connected with the CN 524 via an S1 interface 528. In embodiments, the S1 interface 528 may be split into two parts, an S1 user plane (S1-U) interface, which carries traffic data between the base station 512 or base station 514 and a serving gateway (S-GW), and the S1-MME interface, which is a signaling interface between the base station 512 or base station 514 and mobility management entities (MMEs).

In embodiments, the CN 524 may be a 5GC, and the RAN 506 may be connected with the CN 524 via an NG interface 528. In embodiments, the NG interface 528 may be split into two parts, an NG user plane (NG-U) interface, which carries traffic data between the base station 512 or base station 514 and a user plane function (UPF), and the S1 control plane (NG-C) interface, which is a signaling interface between the base station 512 or base station 514 and access and mobility management functions (AMFs).

Generally, an application server 530 may be an element offering applications that use internet protocol (IP) bearer resources with the CN 524 (e.g., packet switched data services). The application server 530 can also be configured to support one or more communication services (e.g., VoIP sessions, group communication sessions, etc.) for the UE 502 and UE 504 via the CN 524. The application server 530 may communicate with the CN 524 through an IP communications interface 532.

Figure 6:
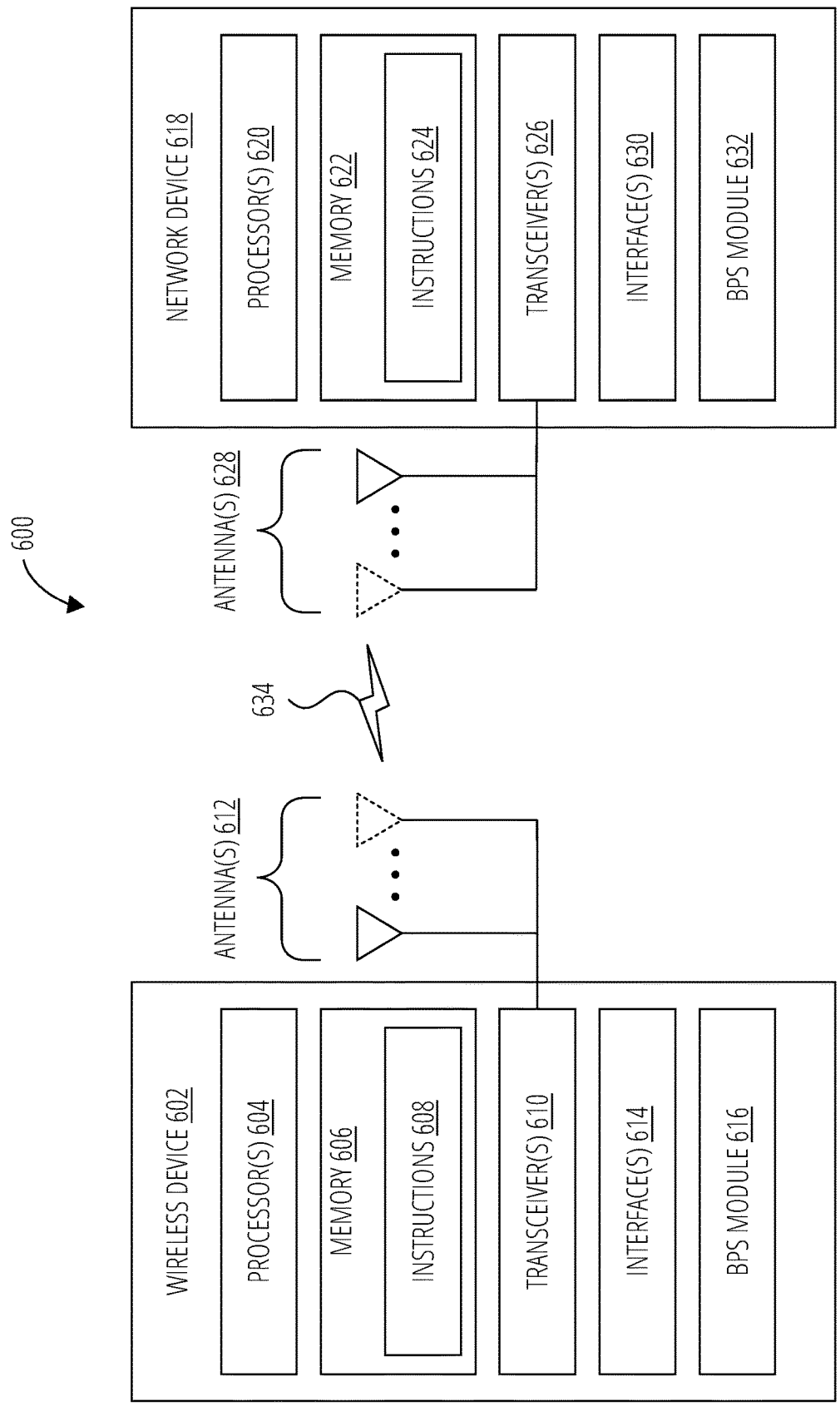
FIG. 6 illustrates a system for performing signaling between a wireless device and a network device, according to embodiments disclosed herein.

FIG. 6 illustrates a system 600 for performing signaling 634 between a wireless device 602 and a network device 618, according to embodiments disclosed herein. The system 600 may be a portion of a wireless communications system as herein described. The wireless device 602 may be, for example, a UE of a wireless communication system. The network device 618 may be, for example, a base station (e.g., an eNB or a gNB) of a wireless communication system.

The wireless device 602 may include one or more processor(s) 604. The processor(s) 604 may execute instructions such that various operations of the wireless device 602 are performed, as described herein. The processor(s) 604 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 602 may include a memory 606. The memory 606 may be a non-transitory computer-readable storage medium that stores instructions 608 (which may include, for example, the instructions being executed by the processor(s) 604). The instructions 608 may also be referred to as program code or a computer program. The memory 606 may also store data used by, and results computed by, the processor(s) 604.

The wireless device 602 may include one or more transceiver(s) 610 that may include radio frequency (RF) transmitter and/or receiver circuitry that use the antenna(s) 612 of the wireless device 602 to facilitate signaling (e.g., the signaling 634) to and/or from the wireless device 602 with other devices (e.g., the network device 618) according to corresponding RATs.

The wireless device 602 may include one or more antenna(s) 612 (e.g., one, two, four, or more). For embodiments with multiple antenna(s) 612, the wireless device 602 may leverage the spatial diversity of such multiple antenna(s) 612 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 602 may be accomplished according to precoding (or digital beamforming) that is applied at the wireless device 602 that multiplexes the data streams across the antenna(s) 612 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 602 may implement analog beamforming techniques, whereby phases of the signals sent by the antenna(s) 612 are relatively adjusted such that the (joint) transmission of the antenna(s) 612 can be directed (this is sometimes referred to as beam steering).

The wireless device 602 may include one or more interface(s) 614. The interface(s) 614 may be used to provide input to or output from the wireless device 602. For example, a wireless device 602 that is a UE may include interface(s) 614 such as microphones, speakers, a touchscreen, buttons, and the like in order to allow for input and/or output to the UE by a user of the UE. Other interfaces of such a UE may be made up of made up of transmitters, receivers, and other circuitry (e.g., other than the transceiver(s) 610/antenna(s) 612 already described) that allow for communication between the UE and other devices and may operate according to known protocols (e.g., Wi-Fi©, Bluetooth®, and the like).

The wireless device 602 may include a BPS module 616. The BPS module 616 may be implemented via hardware, software, or combinations thereof. For example, the BPS module 616 may be implemented as a processor, circuit, and/or instructions 608 stored in the memory 606 and executed by the processor(s) 604. In some examples, the BPS module 616 may be integrated within the processor(s) 604 and/or the transceiver(s) 610. For example, the BPS module 616 may be implemented by a combination of software components (e.g., executed by a DSP or a general processor) and hardware components (e.g., logic gates and circuitry) within the processor(s) 604 or the transceiver(s) 610.

The BPS module 616 may be used for various aspects of the present disclosure, for example, aspects of FIGS. 1-4. The BPS module 616 is configured to identify UL gap capabilities and preferences of a UE, as well as performing measurements associated with activating configured UL gaps.

The network device 618 may include one or more processor(s) 620. The processor(s) 620 may execute instructions such that various operations of the network device 618 are performed, as described herein. The processor(s) 604 may include one or more baseband processors implemented using, for example, a CPU, a DSP, an ASIC, a controller, an FPGA device, another hardware device, a firmware device, or any combination thereof configured to perform the operations described herein.

The network device 618 may include a memory 622. The memory 622 may be a non-transitory computer-readable storage medium that stores instructions 624 (which may include, for example, the instructions being executed by the processor(s) 620). The instructions 624 may also be referred to as program code or a computer program. The memory 622 may also store data used by, and results computed by, the processor(s) 620.

The network device 618 may include one or more transceiver(s) 626 that may include RF transmitter and/or receiver circuitry that use the antenna(s) 628 of the network device 518 to facilitate signaling (e.g., the signaling 634) to and/or from the network device 618 with other devices (e.g., the wireless device 602) according to corresponding RATs.

The network device 618 may include one or more antenna(s) 628 (e.g., one, two, four, or more). In embodiments having multiple antenna(s) 628, the network device 618 may perform MIMO, digital beamforming, analog beamforming, beam steering, etc., as has been described.

The network device 618 may include one or more interface(s) 630. The interface(s) 630 may be used to provide input to or output from the network device 618. For example, a network device 618 that is a base station may include interface(s) 630 made up of transmitters, receivers, and other circuitry (e.g., other than the transceiver(s) 626/antenna(s) 628 already described) that enables the base station to communicate with other equipment in a core network, and/or that enables the base station to communicate with external networks, computers, databases, and the like for purposes of operations, administration, and maintenance of the base station or other equipment operably connected thereto.

The network device 618 may include a BPS module 632. The BPS module 632 may be implemented via hardware, software, or combinations thereof. For example, the BPS module 632 may be implemented as a processor, circuit, and/or instructions 624 stored in the memory 622 and executed by the processor(s) 620. In some examples, the BPS module 632 may be integrated within the processor(s) 620 and/or the transceiver(s) 626. For example, the BPS module 632 may be implemented by a combination of software components (e.g., executed by a DSP or a general processor) and hardware components (e.g., logic gates and circuitry) within the processor(s) 620 or the transceiver(s) 626.

The BPS module 632 may be used for various aspects of the present disclosure, for example, aspects of FIGS. 1-4. The BPS module 632 is configured to identify UL gap capabilities/preferences of a UE, identify triggers of a UL gap, and activate (implicitly or explicitly) a UL gap in response to an occurrence of UL gap triggers.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for activating an uplink (UL) gap at a base station, the method comprising:
   decoding a user equipment (UE) UL gap capability report received from a UE;
   encoding a radio resource control (RRC) UL gap configuration for transmission to the UE;
   decoding a power headroom report (PHR) medium access control (MAC) control element (CE) received from the UE, the PHR MAC CE including at least one of a P value or a power management maximum power reduction (P-MPR) value, decoding the measurement information including determining that the P value is equal to one or the P-MPR value is greater than zero; and
   based on determining that the P value is equal to one or the P-MPR value is greater than zero, implicitly activating the UL gap configuration.

2. The method of claim 1, wherein implicitly activating the UL gap configuration comprises activating the UL gap configuration without explicitly informing the UE of activation of the UL gap configuration.

3. The method of claim 1, wherein the UL gap configuration is implicitly activated immediately after transmission of the PHR MAC CE, after processing the PHR MAC CE for approximately three milliseconds (ms), or after implicit acknowledgment of the base station receiving the PHR MAC CE.

4. The method of claim 1, further comprising:
   decoding a transmission including additional measurement information received from the UE after the configured UL gap is implicitly activated, the measurement information including at least one of a buffer status report (BSR), a second P-MPR value, a Layer 1 reference signal received power (L1-RSRP), or a Layer 3 RSRP (L3-RSRP); and
   implicitly deactivating the UL gap configuration based on a value of at least one of the BSR, the second P-MPR, the L1-RSRP, or the L3-RSRP, or an explicit request from the UE to deactivate the UL gap configuration.

5. The method of claim 4, wherein the UL gap configuration is implicitly deactivated immediately after a last orthogonal frequency-division multiplexing (OFDM) symbol of the transmission including the additional measurement information, approximately three milliseconds (ms) after the transmission including the additional measurement information, or after implicit acknowledgment of the base station receiving the transmission including the additional information.

6. The method of claim 4, wherein implicitly deactivating the UL gap configuration is further based on comparing at least one of the value of the BSR, the second P-MPR, the L1-RSRP, or the L3-RSRP against a corresponding threshold configured for each of the BSR, the second P-MPR, the L1-RSRP, and the L3-RSRP.

7. The method of claim 1, wherein the UE UL gap capability report includes an indication that the UE supports implicit UL gap activation.

8. The method of claim 1, wherein a P field associated with the P value is encoded jointly with a maximum permissible exposure (MPE) value to thereby provide greater granularity associated with the measurement information and the additional measurement information.

9. The method of claim 1, wherein P-MRP values are redefined using a first table for a first set of P-MPR values when the P value is equal to zero and a second table for a second set of P-MPR values when the P value is equal to one to thereby provide greater granularity associated with the measurement information and the additional measurement information.

10. The method of claim 1, wherein a reserved bit within a power headroom (PHR) medium access control (MAC) control element (CE) is used to provide greater granularity associated with the measurement information and the additional measurement information, using the reserved bit within the PHR MAC CE comprising at least one of the following:
    jointly encoding the reserved bit with a P field associated with the P value and an MPR field associated with the P-MPR value;
    jointly encoding the reserved bit with the MPR field; or
    jointly encoding the reserved bit with the P field.

11. A base station comprising:
    a processor; and
    a memory storing instructions that, when executed by the processor, configure the base station to:
       decode a user equipment (UE) UL gap capability report received from a UE;
       encode a radio resource control (RRC) UL gap configuration for transmission to the UE;
       decode a power headroom report (PHR) medium access control (MAC) control element (CE) received from the UE, the PHR MAC CE including at least one of a P value or a power management maximum power reduction (P-MPR) value, decoding the measurement information including determining that the P value is equal to one or the P-MPR value is greater than zero; and
       based on determining that the P value is equal to one or the P-MPR value is greater than zero, implicitly activate the UL gap configuration.

12. The base station of claim 11, wherein implicitly activating the UL gap configuration comprises activating the UL gap configuration without explicitly informing the UE of activation of the UL gap configuration.

13. The base station of claim 11, wherein the UL gap configuration is implicitly activated immediately after transmission of the PHR MAC CE, after processing the PHR MAC CE for approximately three milliseconds (ms), or after implicit acknowledgment of the base station receiving the PHR MAC CE.

14. The base station of claim 11, wherein the UE UL gap capability report includes an indication that the UE supports implicit UL gap activation.

15. The base station of claim 11, wherein a P field associated with the P value is encoded jointly with a maximum permissible exposure (MPE) value to thereby provide greater granularity associated with the measurement information and the additional measurement information.

16. The base station of claim 11, wherein P-MRP values are redefined using a first table for a first set of P-MPR values when the P value is equal to zero and a second table for a second set of P-MPR values when the P value is equal to one to thereby provide greater granularity associated with the measurement information and the additional measurement information.

17. A non-transitory computer-readable storage medium, the computer-readable storage medium including instructions that when executed by a processor of a base station, cause the base station to:
    decode a user equipment (UE) UL gap capability report received from a UE;

encode a radio resource control (RRC) UL gap configuration for transmission to the UE;

decode a power headroom report (PHR) medium access control (MAC) control element (CE) received from the UE, the PHR MAC CE including at least one of a P value or a power management maximum power reduction (P-MPR) value, decoding the measurement information including determining that the P value is equal to one or the P-MPR value is greater than zero; and based on determining that the P value is equal to one or the P-MPR value is greater than zero, implicitly activate the UL gap configuration.

18. The non-transitory computer-readable storage medium of claim 17, wherein implicitly activating the UL gap configuration comprises activating the UL gap configuration without explicitly informing the UE of activation of the UL gap configuration.

19. The non-transitory computer-readable storage medium of claim 17, wherein the UE UL gap capability report includes an indication that the UE supports implicit UL gap activation.

20. The non-transitory computer-readable storage medium of claim 17, wherein a P field associated with the P value is encoded jointly with a maximum permissible exposure (MPE) value to thereby provide greater granularity associated with the measurement information and the additional measurement information.

* * * * *